(12) United States Patent
Sbongk

(10) Patent No.: US 8,696,279 B2
(45) Date of Patent: Apr. 15, 2014

(54) L-SHAPED TOLERANCE ADJUSTMENT CLIP

(75) Inventor: Albert Sbongk, Niederstetten (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/388,424

(22) PCT Filed: Aug. 2, 2010

(86) PCT No.: PCT/US2010/044125
§ 371 (c)(1),
(2), (4) Date: Feb. 1, 2012

(87) PCT Pub. No.: WO2011/017264
PCT Pub. Date: Feb. 10, 2011

(65) Prior Publication Data
US 2012/0128412 A1     May 24, 2012

(30) Foreign Application Priority Data

Aug. 3, 2009    (DE) .......................... 10 2009 035 874

(51) Int. Cl.
*F16B 37/02*          (2006.01)

(52) U.S. Cl.
USPC ............................. 411/174; 411/175; 411/970

(58) Field of Classification Search
USPC ........ 403/408.1; 411/103, 174, 175, 176, 970
See application file for complete search history.

(56) References Cited

U.S. PATENT DOCUMENTS

| | | | |
|---|---|---|---|
| 2,861,618 A | 11/1958 | Tinnerman | |
| 4,684,305 A | 8/1987 | Dubost | |
| 5,713,707 A | 2/1998 | Gagnon | |
| 6,474,917 B2 * | 11/2002 | Gauron | ......................... 411/112 |
| 6,918,725 B2 | 7/2005 | Gauron | |
| 7,878,745 B2 * | 2/2011 | Allen et al. | .................... 411/175 |
| 2002/0119026 A1 | 8/2002 | Gauron | |
| 2007/0243038 A1 * | 10/2007 | Rausch et al. | .................. 411/91 |
| 2008/0247842 A1 | 10/2008 | Motsch et al. | |
| 2008/0310931 A1 | 12/2008 | Csik et al. | |
| 2009/0016845 A1 | 1/2009 | Giraud | |

FOREIGN PATENT DOCUMENTS

| | | |
|---|---|---|
| CN | 101018954 | 8/2007 |
| CN | 101018954 A | 8/2007 |
| DE | 102005050513 A1 | 4/2007 |
| DE | 102005059523 A1 | 6/2007 |
| EP | 0199614 A1 | 10/1986 |
| JP | 2002276638 A | 9/2002 |
| WO | 9747892 A1 | 12/1997 |
| WO | 0198033 A2 | 12/2001 |

OTHER PUBLICATIONS

ISR for PCT/US2010/044125 dated Nov. 5, 2010.

* cited by examiner

*Primary Examiner* — Victor MacArthur
(74) *Attorney, Agent, or Firm* — Lowe Hauptman & Ham LLP

(57) ABSTRACT

A device for connecting two components, comprising at least one leg, which has a fastening opening and which is connected to at least one holder, further comprising a pin receptacle for receiving a fastening pin which can be guided through the fastening opening, wherein the leg and the pin receptacle delimit between each other a receiving slit for a first component, and wherein the leg, on its side facing away from the receiving slit, has at least one abutment surface for a second component, wherein in each case at least two guiding bars run along two opposing sides of the pin receptacle, and these guiding bars connect the pin receptacle to the holder such that it can be moved elastically in its axial direction.

10 Claims, 4 Drawing Sheets

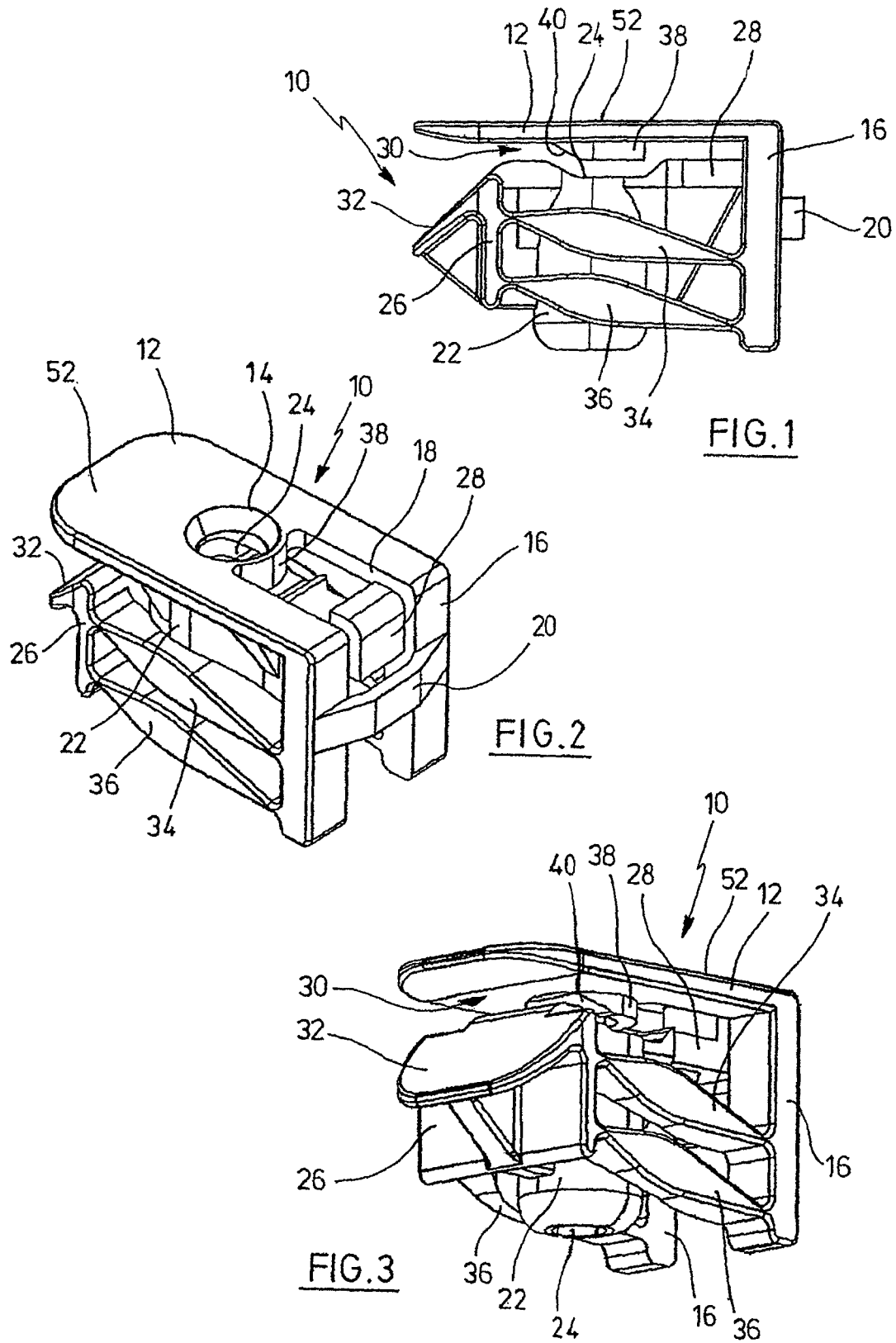

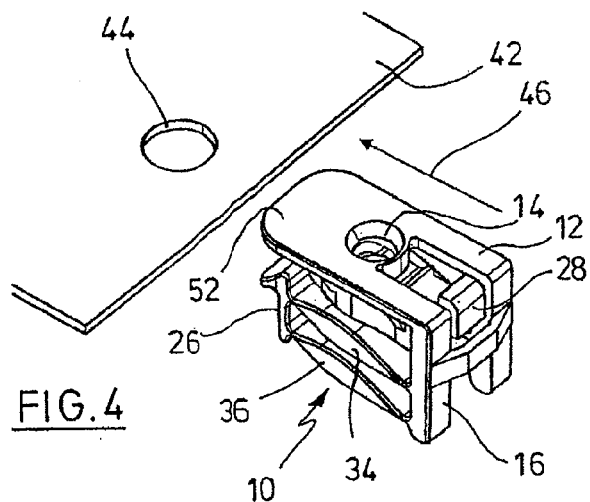
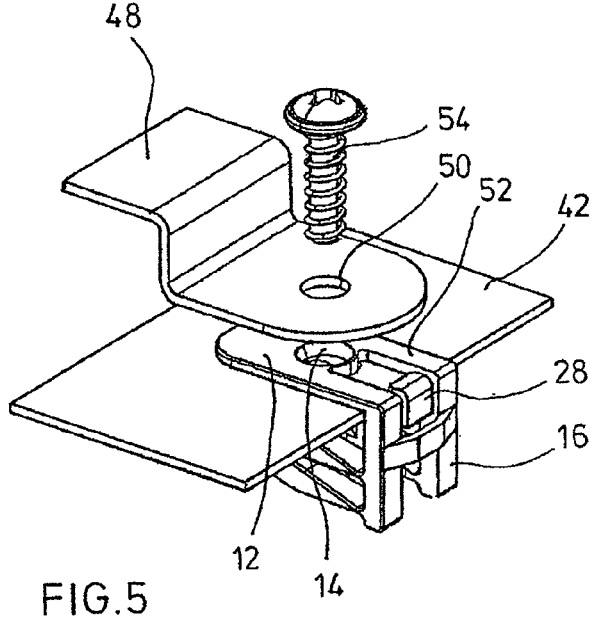
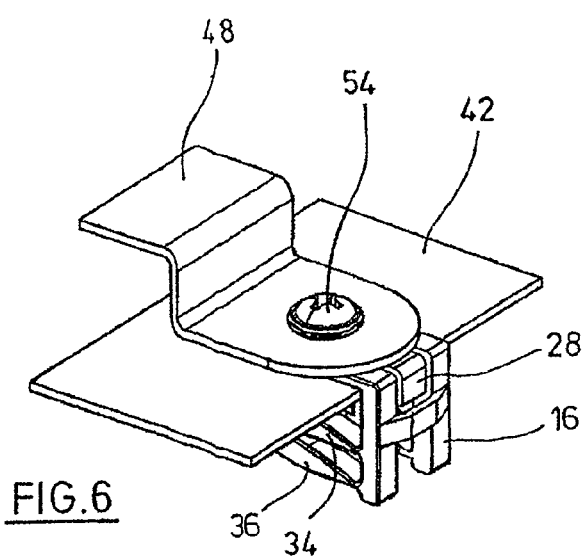

L-SHAPED TOLERANCE ADJUSTMENT CLIP

RELATED APPLICATIONS

The present application is national phase of PCT/US2010/044125 filed Aug. 2, 2010, and claims priority from German Application Number 10 2009 035 874.9 filed Aug. 3, 2009.

The invention relates to a device for connecting two components, comprising at least one leg, which has a fastening opening and which is connected to at least one holder, further comprising a pin receptacle for receiving a fastening pin which can be guided through the fastening opening, wherein the leg and the pin receptacle delimit between each other a receiving slit for a first component, and wherein the leg, on its side facing away from the receiving slit, has at least one abutment surface for a second component.

Such clips are used, for example, to connect flat components of an automobile. The device may have a pin receptacle in the form of a screw receptacle. For the purpose of connecting the components, in the first instance the first component is inserted into the receiving slit. Thereafter, a second component is positioned on the upper abutment surface of the leg. In this state, a fastening pin, for example a screw, can be inserted, for example screwed, into the pin receptacle through a suitable opening in the second component, the opening in the leg and a suitable opening in the first component. This results in the two components being in the connected state. Such fastening clips are used, in particular, for thin or sandwich components and for components without any screw-in domes or for very thin panels. A fastening clip is known, for example, from EP 1 375 934 A1.

It is often necessary for components of different thicknesses to be received in the receiving slit. In order for it to be possible to compensate in a variable manner for a corresponding range of thicknesses, WO 2006/024527 A1 proposes fastening a nut part in an axially resilient manner, by way of its end, on a leg via a plurality of clasps which run from the end of the nut part to the leg. According to another configuration, the aforementioned document proposes fastening the nut part, by way of its end, on a leg via one flexible clasp and on a holder via a further flexible clasp. Both configurations are intended to allow axially resilient movement of the nut part and thus adaptation of the receiving slit to different component thicknesses. The known clip, however, is of comparatively complex design. Moreover, tilting of the nut part as it moves axially is not always ruled out. It is thus possible for the receptacle of the nut part and the fastening opening in the leg not always to be aligned with one another, and this makes it more difficult to screw in a fastening screw.

Proceeding from the prior art explained above, it is an object of the invention to provide a device of the type mentioned in the introduction which makes it possible straightforwardly and in a highly reliable manner in respect of installation, and with simultaneously low installation forces, to adapt the receiving slit to different component thicknesses.

This object is achieved by the subject matter of claim 1. Advantageous configurations can be found in the dependent claims, the description and the figures.

For a device of the type mentioned in the introduction, the object is achieved in the invention in that in each case at least two guiding bars run along two opposing sides of the pin receptacle, and these guiding bars connect the pin receptacle to the holder such that it can be moved elastically in its axial direction. The clip according to the invention serves, for example, for connecting two flat components of an automobile, such as panels, paneling parts or the like. It has a, for example, essentially L-shaped basic body formed from the leg and the holder. The holder and the leg may be formed in more than one part and/or with recesses. A pin receptacle is attached to the holder. This pin receptacle may be of cylindrical basic shape. According to the invention, the pin receptacle is attached to the holder on both sides via at least two guiding bars running, in particular, parallel to one another. The guiding bars guide the pin receptacle in a straightforward and reliable manner at all times such that the pin receptacle can execute a resilient movement in the direction of its longitudinal axis (that is to say the axis along which the fastening pin is inserted into the pin receptacle) relative to the leg without tilting. Rather, in each axial position of the pin receptacle, the receiving opening of the latter is aligned with the fastening opening of the leg. The guiding bars retain the pin receptacle in its rest position such that there is only a narrow receiving slit, if any at all, between the pin receptacle and the leg. The pin receptacle can be moved axially away from the leg, out of this rest position, so that the receiving slit is enlarged in accordance with the respective component thickness. This gives rise to a high level of tolerance in respect of different component thicknesses.

For the purpose of fastening the components on one another, in the first instance a first component, for example a vehicle panel, is pushed into the receiving slit. The pin receptacle here is pushed away axially out of its rest position sufficiently far from the leg for the carrier component to be pushed into the receiving slit. The first component has a fastening opening which, in the state in which the first component has been pushed into the slit, is aligned with the fastening opening of the leg and the receiving opening of the pin receptacle. Thereafter, a second component, for example a carrier component, is positioned on the abutment surface of the leg. The second component likewise has a fastening opening which, in the state in which the second component has been positioned on the abutment surface, is aligned with the fastening opening of the leg, the receiving opening of the pin receptacle and the fastening opening of the first component. A fastening pin can then be inserted into the receiving opening of the pin receptacle in the first instance through the opening of the second component, then through the fastening opening of the leg and the opening of the first component, so that the components are fixed to one another.

The invention provides for a high level of reliability in respect of installation along with the application of only low installation force, repeated removal and installation being readily possible. At the same time, the clip is suitable, in a flexible manner, for component thicknesses which differ over a wide range. It can thus be used widely. Furthermore, it is distinguished by low production costs.

According to one configuration, the pin receptacle may be connected to at least one fastening section located opposite the holder, wherein the guiding bars each run between the fastening section and the holder. It may then also be provided that two guiding bars, running along one side of the pin receptacle, form a parallelogram together with a section of the fastening section and a section of the holder in each axial movement position of the pin receptacle. This therefore gives rise to a pin-receptacle linkage in the form of a parallelogram or to a parallelogram linkage for the pin receptacle. The parallelogram is formed, in particular, by the longitudinal axes of the connecting bars and the respective sections of the fastening section and of the holder. This ensures particularly reliable axial guidance of the pin receptacle without the latter being able to tilt in relation to its longitudinal axis upon insertion of components of different thicknesses. The fastening section may be, for example, of a basic shape which is oriented parallel to the holder, for example rectangular or the like.

The guiding bars may be, in a particularly practical manner, pivotably attached to the holder and/or to the fastening section. Furthermore, the guiding bars may taper in the region of their attachment to the holder and/or to the fastening section. In the region of their attachment to the holder and/or fastening section, they are thus thin enough to be capable of being pivoted about their attachment in a manner similar to a film hinge. This means that the axial movability of the pin receptacle can be realized in a particularly straightforward manner.

The pin receptacle may have a securing section extending into a recess of the holder, so that a rotation of the pin receptacle about its longitudinal axis is limited, in particular inhibited. Providing the securing section in the form of a projection which projects into the holder, or as an extension which projects into the holder, thus gives rise to a rotation-prevention means which ensures that the pin receptacle is not rotated about its longitudinal axis for example when a fastening screw is screwed in. As an alternative, or in addition, it is also conceivable to provide a rotation-prevention means in that those side surfaces of the pin receptacle which face the connecting bars run parallel to the connecting bars at least in certain sections, so that a rotation of the pin receptacle about its longitudinal axis is limited, in particular inhibited. The pin receptacle is thus fixed against rotation between the connecting bars. It may be, for example, rectangular in cross section.

According to a further configuration, a projection may be arranged on that side of the leg which faces the pin receptacle and/or on the pin receptacle, and this projection engages in an opening of a component upon insertion of the component into the receiving slit. This gives rise to the formation of a loss safeguard, which cannot disengage even upon subsequent introduction of the fastening pin into the pin receptacle. It is thus possible for the projection, formed for example as a latching projection, to latch in the component opening provided for the fastening pin when a flat component is pushed into the receiving slit, so that it is not then possible for the device to slip off from the component in an undesirable manner. In order to allow the component to be introduced into the receiving slit, the pin receptacle in the first instance can be pushed away axially from the leg to a sufficient extent. The pin receptacle then automatically moves back as far as possible in the direction of the component, wherein the projection latches in the component opening. The projection may be, for example, ring-shaped or asymmetric. It may have, in particular, suitable introduction slopes for the component. It is also conceivable to have a combination to the extent where the projection, for example, is of a basic ring shape provided with an introduction slope on one side.

In order to improve the axial guidance of the pin receptacle further, it is also possible for more than two connecting bars to run along each side of the pin receptacle. According to a further, particular practical configuration, the pin receptacle may have a screw nut. The fastening pin is then therefore a threaded pin which is screwed into the correspondingly internally threaded screw receptacle. The device may also comprise a fastening pin, for example a fastening screw.

The device may consist of a plastics material. It then has a low weight and is not susceptible to corrosion. In a manner which allows particularly straightforward and advantageous production, the device may be produced by injection molding, for example in one piece.

An exemplary embodiment of the invention will be explained in more detail hereinbelow with reference to figures, in which, schematically:

FIG. 1 shows a side view of a device according to the invention,

FIG. 2 shows a first perspective view of the device from FIG. 1,

FIG. 3 shows a second perspective view of the device from FIG. 1,

Figure 7:
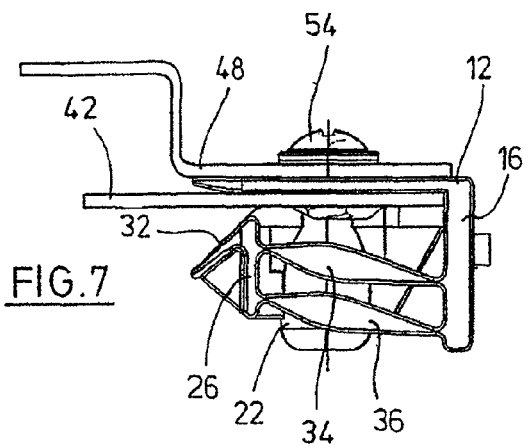
Figure 8:
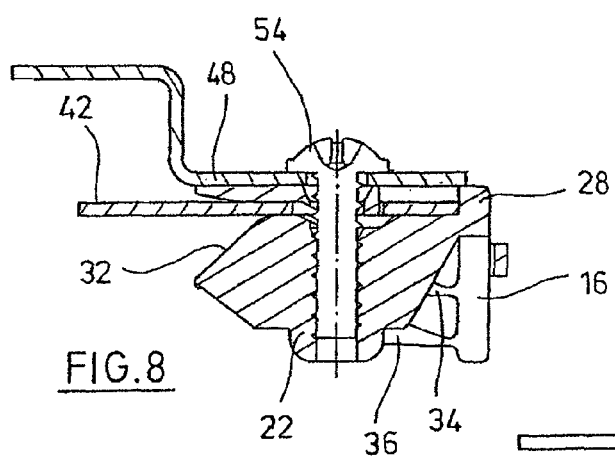
Figure 9:
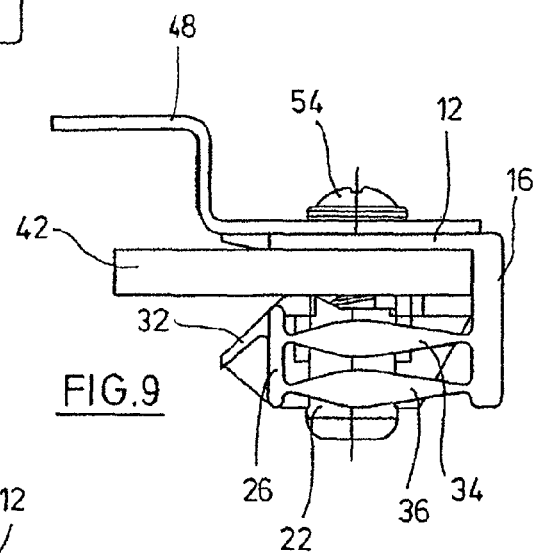
Figure 10:
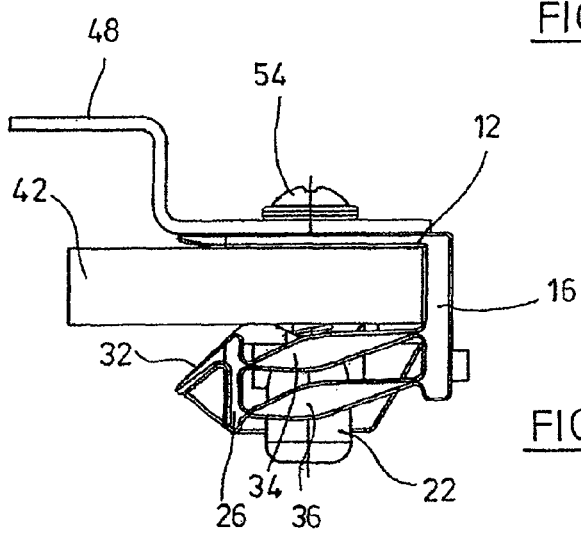
Figure 11:
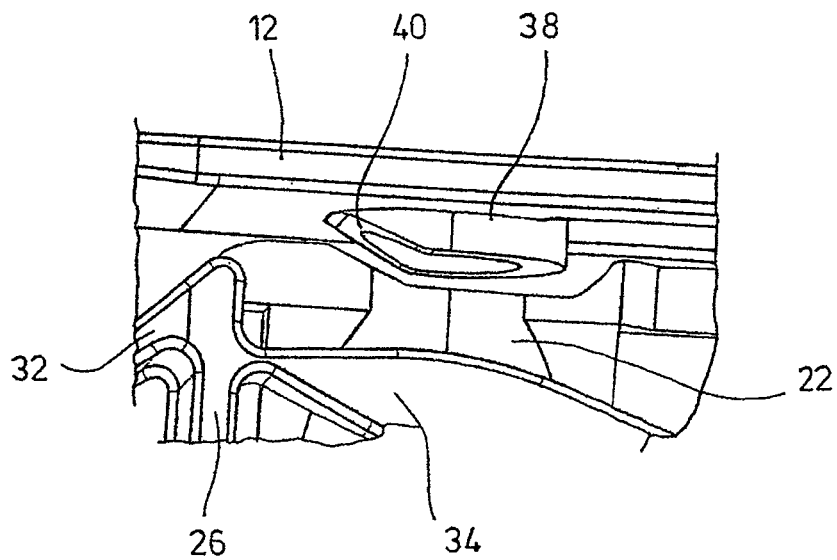
Figure 12:
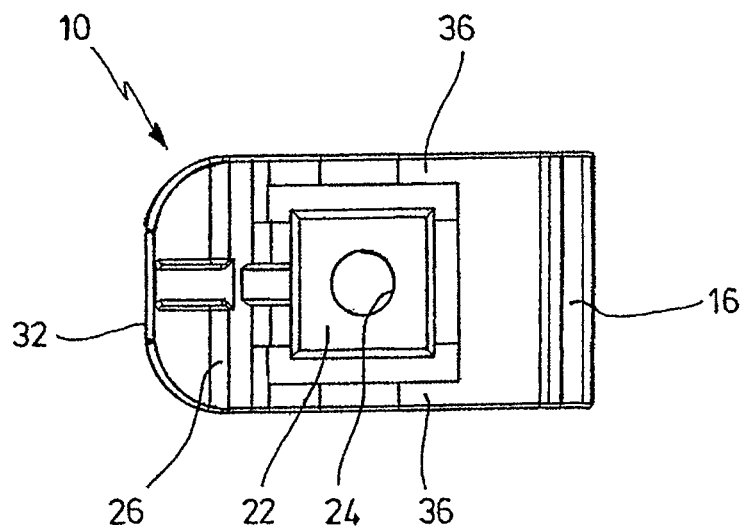

FIG. 4 shows a perspective view of the device from FIG. 1 in a first operating state, FIG. 5 shows a perspective view of the device from FIG. 1 in a second operating state, FIG. 6 shows a perspective view of the device from FIG. 1 in a third operating state, FIG. 7 shows a side view of the device from FIG. 6, FIG. 8 shows a vertical section through the device from FIGS. 6 and 7, FIG. 9 shows a side view of the device from FIG. 7 in a further operating state, FIG. 10 shows a side view of the device from FIG. 7 in a further operating state, FIG. 11 shows a perspective view of a detail of the device from FIG. 1, and FIG. 12 shows a view of the underside of a device according to a further exemplary embodiment of the invention.

Unless indicated to the contrary, the figures use the same designations for the same objects. FIGS. 1 to 3 show different illustrations of a device 10 according to the invention for connecting two components. The device has an essentially plate-like leg 12 which has a circular central fastening opening 14. The leg 12 is connected at one end to a holder 16, which in the present case is formed in two parts. The leg 12 and the holder 16 are oriented essentially at right angles to one another and form an L-shaped basic body. An elongate central recess 18 extends from the leg 12 and continues throughout the holder 16, so that the latter has two sections which run parallel to one another and are connected via a connecting bar 20. Moreover, the device 10 has a screw receptacle 22 which, in the exemplary embodiment which is shown in FIGS. 1 to 3, is essentially cylindrical. It has an internally threaded screw opening 24 which is aligned with the fastening opening 14 of the leg 12. In the example shown, the internal thread of the screw opening 24 passes longitudinally all the way through the screw receptacle 22. The screw receptacle 22, on its side facing away from the holder 16, is connected to a fastening section 26 which is located opposite the holder 16 and is of plate-like basic shape. The fastening section 26 is oriented largely parallel to the two sections of the holder 16. On its side facing the holder 16, the screw receptacle 22 also has an elongate securing section 28, which projects into the recess 18. This limits rotation of the pin receptacle 22 about its longitudinal axis. The leg 12 and the pin receptacle 22, together with the securing section 28 thereof, delimit between each other a receiving slit 30, into which a flat component (not illustrated in FIGS. 1 to 3) can be introduced. In order to facilitate introduction, the fastening section 26 has an introduction slope 32 at its outer end.

Furthermore, in each case two guiding bars 34, 36 run along two opposing sides of the pin receptacle 22. These guiding bars have one end connected to the fastening section 26 and their other end connected to the holder 16. In the region of their attachment to the fastening section 26, on the one hand, and to the holder 16, on the other hand, the guiding bars 34, 36 taper such that they can be pivoted in the region of their attachment in a manner similar to a film hinge. The longitudinal axes of the guiding bars 34, 36 each run parallel to one another. Furthermore, a basically ring-shaped projection 38 is arranged on the underside of the leg 12, the underside being assigned to the receiving slit 30. In the direction of the open end of the receiving slit 30, the projection 38 has a bevel 40, which likewise facilitates insertion of a component into the receiving slit 30. In the example shown, the projection 38 is in the form of a shoulder on the fastening opening 14 of the leg 12. The projection 38 with its bevel 40 is clearly evident in the enlarged detail in FIG. 11.

The function of the device according to the invention will now be explained in more detail with reference to FIGS. 4 to 10. FIG. 4 illustrates the first step for connecting two components, wherein a first component, which in the example shown is a vehicle panel, is shown in detail form at 42. The panel 42 has a circular fastening opening 44. The device 10, then, is pushed onto the component 42, in the direction of the arrow shown at 46 in FIG. 4, such that this component passes into the receiving slit 30. In the first instance here the screw receptacle 22 is pushed away axially downward some way from the leg 12, so that the panel 42 can pass the protrusion 38. As soon as the opening 44 in the panel 42 is aligned with the fastening opening 14 in the leg 12, the projection 38 latches in the component opening 44 and the clip 10 is retained in captive fashion on the first component 42. This state is illustrated in FIG. 5. Thereafter, a second component, which is designated 48, for example a paneling part 48, which likewise has a fastening opening 50, is positioned on the abutment surface 52, formed by the upper side of the leg, such that the component opening 50 is aligned with the leg opening 14. Thereafter, a fastening screw 54 is guided, from above in FIG. 5, into the screw receptacle 22 in the first instance through the opening 50 of the second component 48, then through the leg opening 14 and through the opening 44 in the first component 42, and is screw-connected therein. The screw-connected state is illustrated in FIG. 6. The two components 48, 42 are in a state here in which they are fixed to one another. FIG. 7 shows a side view of the operating state which is shown in FIG. 6, and FIG. 8 shows a view in vertical section.

FIGS. 9 and 10 illustrate the same operating state as in FIGS. 6 to 8, although the first component 42 is thicker in each case. It can be seen that, for adaptation to the different component thicknesses, the screw receptacle 22 has been pushed away downward in the direction of its longitudinal axis from the leg 12, so that the receiving slit 30 is enlarged in accordance with the respective panel thickness. The guidance of the screw receptacle 22 is ensured here by the guiding bars 34, 36. In particular the latter pivot in the region of their attachment to the fastening section 26, on the one hand, and to the holder 16, on the other hand, as is clearly evident from a comparison, in particular, of FIGS. 7, 9 and 10. It can likewise be seen that the longitudinal axes of the guiding bars 34, 36 and the longitudinal axes of those sections of the fastening section 26, on the one hand, and of the holder 16, on the other hand, which run between the respective attachments of the guiding bars form a parallelogram in each of the axial positions of the screw receptacle 22. This parallelogram linkage reliably and straightforwardly ensures axial displaceability of the screw receptacle 22 without it being possible for the latter to tilt in relation to its longitudinal axis. The clip 10 has a high level of tolerance in respect of different component thicknesses, wherein, at the same time, installation by means of the screw 54 is readily possible for any component thickness.

FIG. 12 shows a view from beneath of an exemplary embodiment of another device 10 according to the invention. This device 10 corresponds largely to the device 10 which is shown in FIGS. 1 to 3. In contrast, however, the screw receptacle 22 in this exemplary embodiment is cross-sectionally rectangular, in particular square, rather than being of cylindrical basic shape. This design of the screw receptacle 22 ensures fixing of the screw receptacle 22 between the guiding bars 34, 36, so that rotation of the screw receptacle 22 about its longitudinal axis is limited.

The fastening clips 10 according to the invention illustrated in the exemplary embodiment shown in the figures have been injection-molded in one piece from a plastics material.

The invention claimed is:

1. A device for connecting first and second components, said device comprising:
   at least one holder;
   at least one leg having fastening opening and connected to the at least one holder,
   a fastening pin configured to be guided through the fastening opening; and
   a pin receptacle for receiving the fastening pin,
   wherein
   the leg and the pin receptacle define therebetween a receiving slit for the first component,
   the leg has, on a side facing away from the receiving slit, at least one abutment surface for the second component,
   the device further comprises at least four guiding bars, at least two of which run along a first side of the pin receptacle, and at least two of which run along a second side of the pin receptacle, the first and second sides being opposing sides the guiding bars-connecting the pin receptacle to the holder while enabling the pin receptacle to be moveable elastically along a longitudinal axis of the pin receptacle,
   the pin receptacle has a securing section extending into a recess of the holder for limiting rotation of the pin receptacle about the longitudinal axis, and,
   the device is of monolithic one-piece construction.

2. The device as claimed in claim 1, further comprising:
   at least one fastening section located opposite the holder and connected to the pin receptacle, wherein the guiding bars each run between the fastening section and the holder.

3. The device as claimed in claim 2, wherein the at least two guiding bars running along each side of the pin receptacle form a parallelogram together with a section of the fastening section and a section of the holder in each axial movement position of the pin receptacle.

4. The device as claimed in claim 2, wherein the guiding bars are pivotably attached to at least one of the holder or the fastening section.

5. The device as claimed in claim 2, wherein the guiding bars taper in regions where the guiding bars are attached to the holder or to the fastening section.

6. The device as claimed in claim 1, wherein the sides of the pin receptacle facing the guiding bars run parallel to the guiding bars at least in certain sections to limit a rotation of the pin receptacle about the longitudinal axis.

7. The device as claimed in claim 1, further comprising:
   a projection arranged on at least one of (i) the side of the leg which faces the pin receptacle or (ii) the pin receptacle, the projection configured to engage an opening of the first component upon insertion of the first component into the receiving slit.

8. The device as claimed in claim 7, wherein the projection is ring-shaped or asymmetric.

9. The device as claimed in claim 1, consisting of a plastics material.

10. A device for connecting first and second components, said device comprising:

at least one holder;

at least one leg having fastening opening and connected to the at least one holder, a fastening pin configured to be guided through the fastening opening; and a pin receptacle for receiving the fastening pin, wherein the leg and the pin receptacle define therebetween a receiving slit for the first component, the leg has, on a side facing away from the receiving slit, at least one abutment surface for the second component, the device further comprises at least six guiding bars, more than two of which run along a first side of the pin receptacle, and more than two of which run along a second side of the pin receptacle, the first and second sides being opposing sides the guiding bars connecting the pin receptacle to the holder while enabling the pin receptacle to be moveable elastically along a longitudinal axis of the pin receptacle, the pin receptacle has a securing section extending into a recess of the holder for limiting rotation of the pin receptacle about the longitudinal axis, and the device is of monolithic one-piece construction.

* * * * *